UNITED STATES PATENT OFFICE.

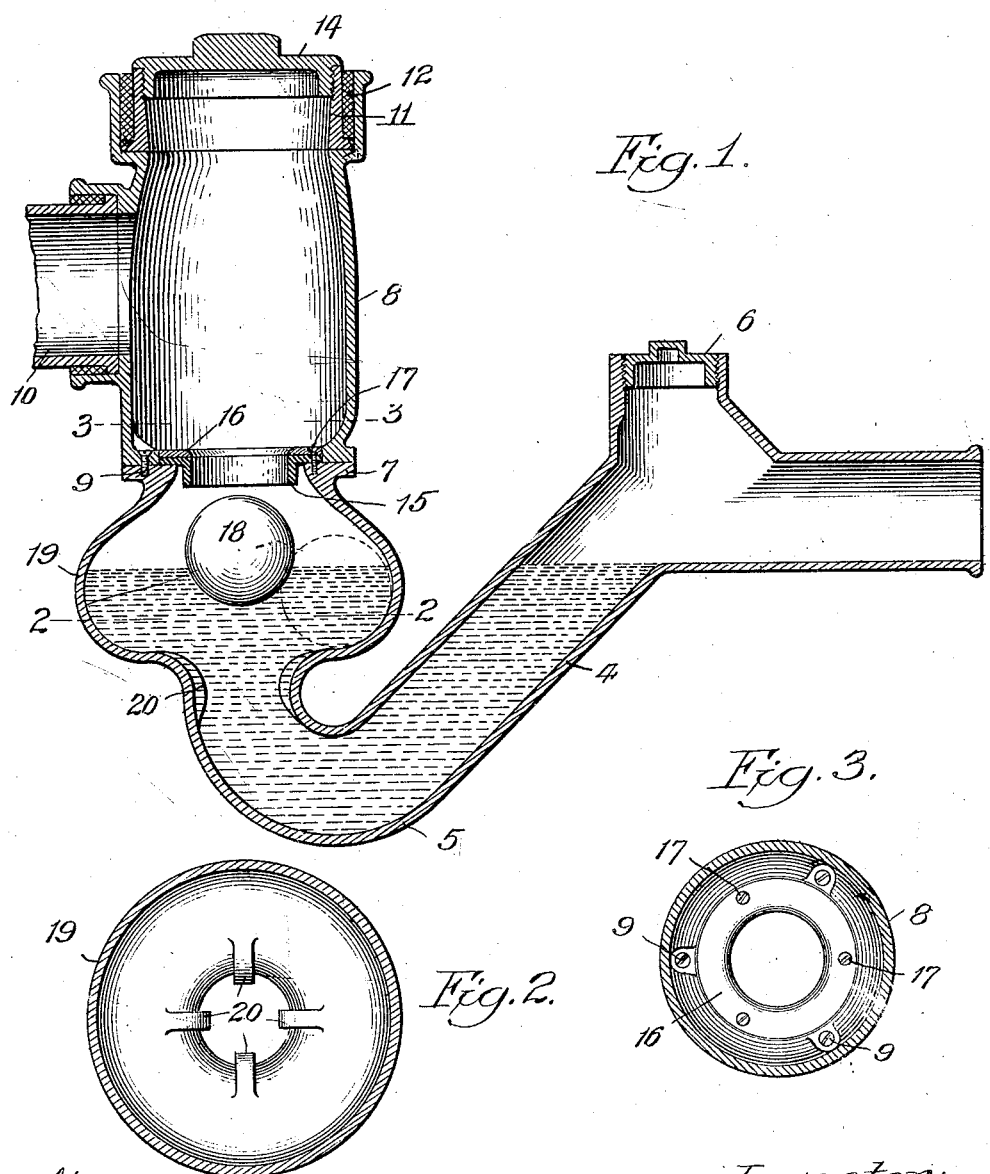

GEORGE J. DEHN, OF CHICAGO, ILLINOIS.

BACKWATER-TRAP FOR DRAIN SYSTEMS.

1,318,545.  Specification of Letters Patent.  Patented Oct. 14, 1919.

Application filed February 17, 1916. Serial No. 78,807.

*To all whom it may concern:*

Be it known that I, GEORGE J. DEHN, a citizen of the United States, and a resident of Chicago, in the county of Cook and State of Illinois, have invented certain new and useful Improvements in Backwater-Traps for Drain Systems, of which the following is a full, clear, and exact description.

The invention relates to back-water traps for drain systems. In back-water traps in which a float is raised against a valve seat to prevent back-flow of water in event of back-pressure in the trap, it sometimes becomes necessary to poke a rod or stick downwardly through the trap to dislodge accumulations which prevent the passage of the drainage through the trap, the accumulations occurring mostly in the trap-bend of the pipe. Frequently, heretofore, in forcing the rod or stick through the trap, the stick or wire would injure the ball-float which is usually formed of copper.

The object of the invention is to provide an improved back-water trap, in which provision is made for permitting the lateral deflection of the copper ball float into or through the trap bend to dislodge obstructions therefrom.

A further object of the invention is to provide a back-water trap which is simple in construction, efficient in operation and which may be readily cleaned.

The invention consists in the several novel features hereinafter set forth and more particularly defined by claims at the conclusion hereof.

In the drawings: Figure 1 is a section of a back-water trap embodying the invention. Fig. 2 is a section taken on line 2—2 of Fig. 1. Fig. 3 is a section taken on line 3—3 of Fig. 1.

The improved back-water trap comprises a pipe 4 having a trap-bend 5 therein. Adjacent the discharge terminal, a clean-out plug 6 is connected to said pipe. The upper end of the inlet terminal of this pipe is provided with a flange 7 to which is secured by screws 9 a fitting 8. A pipe 10 delivers the drainage into one side of the fitting 8 to which it is suitably connected. A sleeve 11 is secured in the upper end of fitting 8, usually by a lead and calked joint 12, and a removable plug 14 is screw-threaded into the upper end of this sleeve. The latter is employed to avoid the expense and inconvenience of cutting threads in the heavy fitting 8.

A flexible valve-seat 15 is secured on top of flange 17 of the trap-pipe by a ring 16 and screws 17. A ball-float 18, usually formed of copper, is adapted to rise into engagement with the rubber seat 15 to effect a closure in event of back-flow of liquid in the trap-pipe. Below the valve-seat, the trap-pipe is bulged or enlarged, as at 19, between the trap-bend and the upper end of the trap-pipe. This enlargement serves to permit the ball-float to assume a position laterally of the axis of the trap-pipe, so that whenever a stick, rod or other instrument is forced downwardly into the trap-bend to dislodge an obstruction or to clean it, the ball will be free to move laterally out of the path of the instrument, or, in other words, to permit the instrument to clear the ball. In this manner deformation of the ball, which will prevent its forming an effective seal against back-flow will be avoided. The wall of the trap-pipe above the enlargement 19 is curved inwardly to direct the ball inwardly toward the axis of the valve-seat and so that the ball will pass into the seat 15. Below the enlargement, the trap-pipe is provided with curved integral lugs 20 which prevent the ball from being forced into or closing the trap-bend, the curved upper portions of these lugs also serving to deflect the ball laterally.

When the tool is to be forced into the trap-bend, it is only necessary to remove the plug 14 to give access to the opening in the valve-seat 15. If replacement of a valve-seat or ball-float should become necessary, it is only necessary to remove screws 17 and ring 16, the opening in the flange 7 being sufficient in size to permit the ball 18 to be readily withdrawn.

The invention thus exemplifies an improved back-water trap in which provision is made for lateral displacement of the ball-float when a cleaning tool is inserted into the trap-pipe, and in which provision is made for ready access to the ball for replacement of the ball for access to the trap bend.

The invention is not to be understood as restricted to the details set forth, since these may be modified within the scope of the appended claim, without departing from the spirit and scope of the invention.

Having thus described the invention, what I claim as new and desire to secure by Letters Patent, is:

A back-water trap comprising a pipe having a trap-bend therein, a downwardly facing valve seat, a ball-float adapted to be forced against the seat by back-flow of water, the pipe having an inside flange at its upper end and an enlargement between the flange and the bend into which the ball will be displaced laterally by a tool inserted through the seat, a fitting having an inside flange secured to the upper end of said pipe, a ring for securing the seat on top of the flange on the pipe, a plug removably secured to the upper end of the fitting and an inlet connection on the fitting.

GEORGE J. DEHN.